United States Patent
Blödow

(10) Patent No.: US 7,141,952 B2
(45) Date of Patent: Nov. 28, 2006

(54) DETERMINATION OF START COMMUTATION IN SYNCHRONOUS SERVO-DRIVES

(75) Inventor: Friedrich Blödow, Flensburg (DE)

(73) Assignee: Fachhochschule Flensburg, Flensburg (DE)

(*) Notice: Subject to any disclaimer, the term of this patent is extended or adjusted under 35 U.S.C. 154(b) by 0 days.

(21) Appl. No.: 11/324,493

(22) Filed: Jan. 3, 2006

(65) Prior Publication Data
US 2006/0108968 A1   May 25, 2006

Related U.S. Application Data

(63) Continuation-in-part of application No. PCT/DE04/001428, filed on Jul. 5, 2004.

(30) Foreign Application Priority Data
Jul. 5, 2003   (DE) ................................. 103 30 551

(51) Int. Cl.
*H02P 1/46* (2006.01)

(52) U.S. Cl. ................ 318/716; 318/700; 318/138; 318/439; 318/254

(58) Field of Classification Search ............... 318/716, 318/700, 254, 138, 439, 727
See application file for complete search history.

(56) References Cited

U.S. PATENT DOCUMENTS 6,592,412 B1 * 7/2003 Geil et al. ................. 440/6

* cited by examiner

*Primary Examiner*—Karen Masih
(74) *Attorney, Agent, or Firm*—Larson & Larson, pp; Herbert W. Larson; James E. Larson

(57) ABSTRACT

Method for the determination of start commutation in synchronous servo-drives by means of two coupled control loops, a current control circuit and an angle control circuit. The angle control circuit contains an incremental position sensor signal. A ramped desired value is predetermined by the current control. A constant angle desired value is predetermined by the angle control. The angle control is embodied in such a manner that is has a faster dynamic than the current control dynamic of the signal which is impinged upon by the current control by rotating the magnetic field. The method can be controlled in all positions by the input of an S-shaped disturbance variable signal in the angle control. The shaft of the electric drive can be mechanically blocked in the position during initialization of the start commutation and is regulated to the same position as in the beginning of the start commutation.

5 Claims, 1 Drawing Sheet

DETERMINATION OF START COMMUTATION IN SYNCHRONOUS SERVO-DRIVES

PRIOR APPLICATIONS

This application is a continuation-in-part of International Application No. PCT/DE2004/001428, filed on Jul. 5, 2004, which in turn bases priority on German Application No. 103 30 551.3, filed on Jul. 5, 2003.

BACKGROUND OF THE INVENTION

1. Field of Invention

This invention relates to a method for determining the start commutation in rotary and linear synchronous and reluctance servo-drives with the aid of two coupled control loops or circuits.

2. Description of the Prior Art

Direct current machines have a collector and two or more brushes serving as commutators. In the direct current machine, the said commutator ensures that the current always flows through the windings in the armature in such a way that the magnetic fields resulting from the current attract so that a torque is generated, and in this way the motor shaft rotates. In the case of synchronous servo-drives, which nowadays have largely replaced direct current machines due to certain decisive advantages (approximately 50% smaller construction volume for the same power with no need of maintaining the brushes), said commutator is missing. Said commutator must be simulated in the servo amplifier, complex electronics also providing the current control, speed control and position control of the synchronous servo-drive, is nowadays almost always implemented with the aid of Clarke-Park transformation. For simulating the commutator, switching on the electronics of the servo amplifier initially requires the rotor position relative to the stator, hereinafter called "start commutation". This information can be provided with corresponding costs by a measuring system or use is made of the method according to DE 196 04 701 C1, which requires additional hardware.

EP 784 378 A2 discloses a method for initializing the start commutation for a synchronous motor with incremental position sensors in which a position controller and a current controller are used, and with said position controller the motor movement is minimized on the basis of the commutation initialization. Thus, a quantity consisting of moment-forming and flow-forming components are impressed in the direction of the estimated rotor position angle in that the moment-forming component is selected as zero, and the flow-forming component is chosen with a value higher than zero (estimated). If the rotor position angle estimated value diverges from the actual rotor position angle, a torque is generated which causes a rotor movement in the direction of the estimated rotor position. Thus, in the least favourable estimated case, an angular movement of the rotor is required which does not make it possible to start it from the stationary, i.e. fixed braked state.

It is disadvantageous in the prior art that implementation takes place in the form of additional hardware which, as a function of the data of the electric drive, must be hardware-adapted, and that the electrical machine must twice perform an uncontrolled movement in the millimetre range so that such methods cannot function when the brake is applied. It is also disadvantageous that the position change resulting from the uncontrolled movement is maintained after finding the start commutation, and the implemented mathematical equations necessary in the servo amplifier for vector control using Clarke-Park transformation cannot be used for finding the start commutation which makes the additional hardware costs considerable.

The problem of the invention is to provide a simple method making it possible in the case of dynamic movement freedom and zero movement freedom in the stationary end value, using the hardware and software which is always present in any vector-controlled electric drive, to determine the start commutation, and after producing the latter to keep the electric drive by means of electromotive force in the position which it occupied prior to the start of finding the start commutation.

SUMMARY OF THE INVENTION

I have developed a method for determining the start commutation of synchronous servo-drives using two coupled control circuits, a current control circuit and an angle control circuit. The angle control, whose dynamics are faster than those of the current control, controls out the signal applied through the current control by rotating the magnetic field.

Of particular importance e.g. in machine tools with a Z-shaft, uncontrolled movements can no longer be prevented by counterweights or springs which have a negative influence on the machine dynamics, and instead the always present brake remains active during the start commutation search process (keep the shaft fixed), and then as the drive is now serviceable and kept in position by the control, can be released without the shaft performing uncontrolled movements.

The invention is robust with respect to fluctuations of the intermediate circuit voltage because the current is controlled, and therefore, fluctuations in the intermediate circuit voltage can be looked upon as a disturbance variable of the current control circuit which can, consequently, be controlled.

The problem of the rotor position with respect to the stator in which no moment or torque is generated, is not eliminated by a second pass, but instead, by introducing into the angle control circuit an S-shaped signal which is slow relative to the control speed of the angle control circuit. This S-shaped signal is advantageously electrically implemented as a cosine signal in multiples of 0° to 180°, the amplitude being shifted to zero in the case of zero degrees. Thus, the amplitude initially starts with zero and zero slope, and also ends with zero slope which is advantageous for controlling in the angle control circuit. This signal is immediately controlled out by the angle control circuit, so that it appears to a minimum extent in the outwards direction, but where the moment less position problem is reliably removed.

It is consequently no longer a 360° rotation of the voltage space indicator $U\alpha$. It is advantageous in this procedure that the current is maintained, i.e. the shaft is still kept in position, and therefore, is unable to perform uncontrolled movements.

With the exception of the measurement of the currents, the invention operates in two lines using an analog-digital converter which is part of the digital signal controller, and as a result of the exclusively digital operations, it functions with a high noise immunity and requires no additional hardware components.

BRIEF DESCRIPTION OF THE DRAWINGS

The detailed description of the invention, contained herein below, may be better understood when accompanied by a brief description of the drawings, wherein.

DETAILED DESCRIPTION OF THE PREFERED EMBODIMENT

Figure 1:
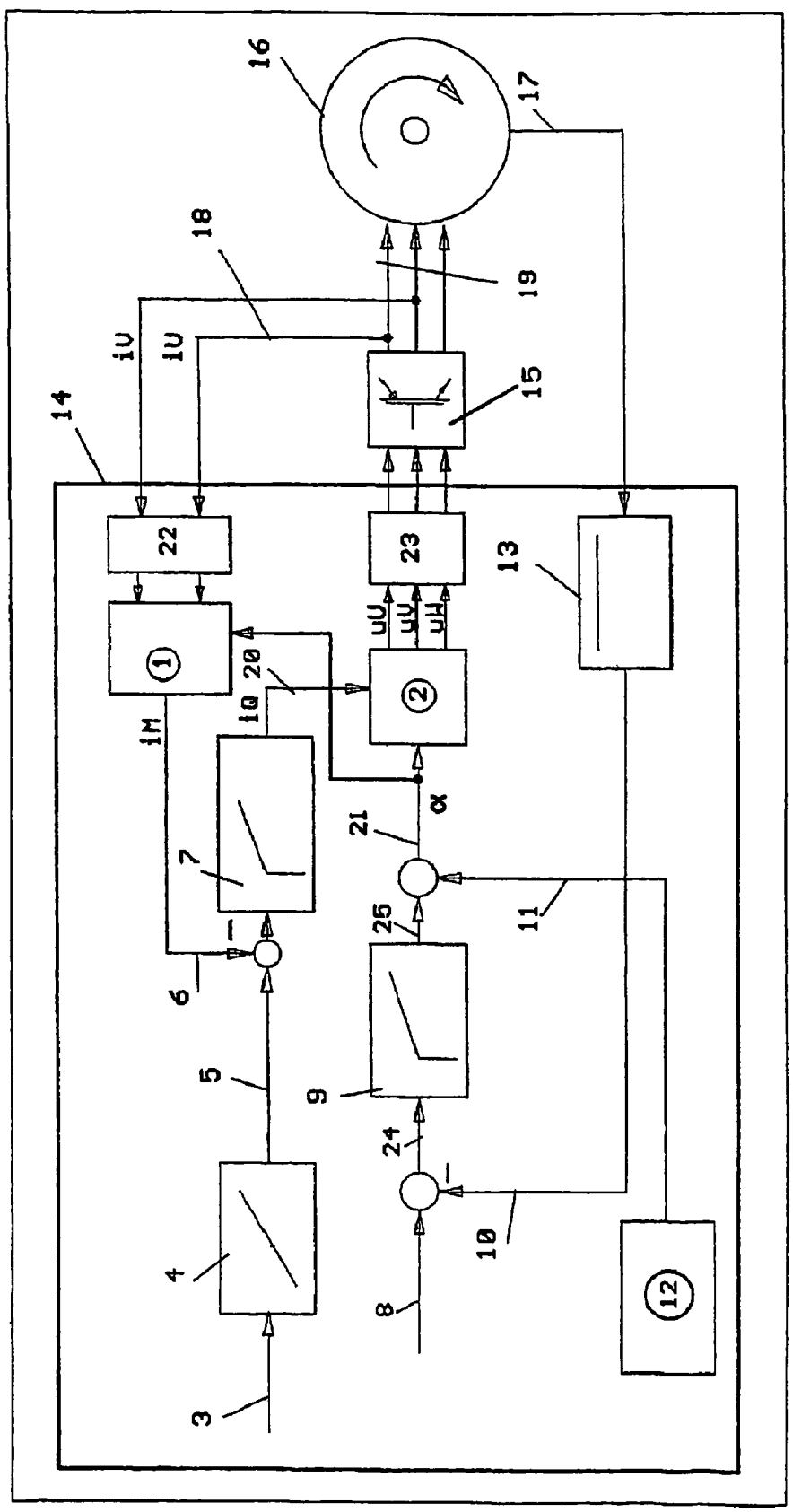
FIG. 1 illustrates a diagrammatic representation of the method of the present invention for determining start commutation in synchronous servo-drives by means of coupled control loops in the form of a current control circuit and an angle control circuit.

In the present invention, the minimized Clarke-Park transformation 1, 2 is linked with two control circuits or loops. For the two control circuits and the Clarke-Park transformation, use is made of the software present in the servo amplifier, and for signal detection (angle and both currents), the hardware present in the servo amplifier. The two control circuits comprise a current control circuit with a ramp-shaped predetermined set value and an angle control circuit.

The current control circuit supplies the angle control circuit with a signal is 20. The angle control circuit which dynamically is designed so as to react much faster than the signal 20 from the current control circuit and ensures that the signal 20 applied by the current control circuit is controlled by rotating the magnetic field, and that the shaft of the electric drive 16 following the end of the control process, is controlled precisely as the same position as that of the electric drive at the start of the control process a and is maintained there.

Thus, the current control circuit supplies the angle control circuit with a slowly rising signal 20 which controls the angle control circuit, because it is dynamically designed in a much faster manner in which it so adjusts the angle of the electromagnetic field 21, that the mechanical angle remains constant in the stationary end value. The angle of the electromagnetic field 21 is the sought starting quantity.

The equations of the minimized clarke-Park transformation reads:

$$iM = -\sin(\alpha) \cdot i_u + \cos(\alpha) \cdot \left(\frac{1}{\sqrt{3}} i_u + \frac{2}{\sqrt{3}} i_v\right) \quad (1)$$

$$uU = -i_Q \cdot \sin(\alpha) \quad (2a)$$

$$uV = -\frac{1}{2} \cdot (-i_Q \cdot \sin(\alpha)) + \frac{\sqrt{3}}{2} \cdot (iQ \cdot \cos(\alpha)) \quad (2b)$$

$$uW = -\frac{1}{2} \cdot (-i_Q \cdot \sin(\alpha)) + \frac{\sqrt{3}}{2} \cdot (iQ \cdot \cos(\alpha)) \quad (2c)$$

The structural image shown in FIG. 1 provides information on the implementation of the invention. The electrical machine 16 (synchronous motor or linear drive) with incremental position sensors is supplied by the three lines 19. The output quantity 17 of the incremental position sensor incorporates two signals displaced by 90°, which are transformed into a relative position in the QEP counter 13 (Quadrature Encoder Pulse Circuit). This relative position is the angle actual value 10 for the angle control circuit. The angle desired value 8 and the angle actual value 10 are preset to the same value at the start of start commutation finding. If the angle actual value 10 diverges from the angle desired value 8 then the angle controller 9, which is adapted to each drive and is usually designed as a PI controller when there is no permanent control deviation, constitutes the angle difference 24, i.e. the position of the shaft of the electric drive or the position of the rotor of the linear drive are kept in the same position. The starting quantity of the angle controller 25 is summated with the S-shaped signal 11 generated in the S-signal generator 12. The result of the summation is the sought quantity a, the commutating angle, which provides the end of the process (approx. 700 ms) with an offset which determines the rotation direction of the motor or the movement direction of the linear drive. Together with the output iQ of the current controller 20, the angle quantity α is introduced into the inverse minimized Clarke-Park transformation 2 (see equations 2a, 2b, 2c), which from the two input quantities α and iQ supplies the three known phases U, V, W into the pulse wide modulator 23. The output quantities of the pulse wide modulator 23 are correspondingly amplified in the power part 15 and supplied to the three motor phases 19, so that the angle control circuit is closed.

The current control circuit obtains its current actual value 6 from the two current measuring signals 18 digitally converted in analog-digital converter 22 and supplied to the minimized Clarke-Park transformation 1. A further important input quantity in said current control circuit is the commutating angle α. The output quantity of the minimized Clarke-Park transformation 1 (see equation (1)) represents the current actual value 6 of the current control. The current desired value 5 is produced in the limited integrator 4, which at the start is supplied with a constant start signal 3 for commutation finding. This start signal can advantageously adjust the duration of the start commutation finding without any hardware changes. The difference of the current desired value 5 and current actual value 6 now passes into the current regulator 7, whose output quantity iQ 20 is passed as a further signal input quantity into the angle control circuit, and by means of inverse minimized Clarke-Park transformation by the pulse wide modulator 23 and power part 15, provides the electric drive 16 with a current rising in accordance with the predetermined set current value 5. This current generates a moment or a force leading to minimum movement, but which is detected by the angle control circuit by the electric drive 17 and QEP counter 13 (Quadrature Encoder Pulse Circuit), and is immediately corrected with the aid of the angle controller 9.

The QEP with two input quantities, the analog-digital converter and the pulse wide modulation unit, are parts of any digital control system of three-phase current drives. The border 14 represents the digital signal processors with integrated periphery used for controlling three-phase current drives. In addition, the movement freedom of the motor shaft or the linear drive rotor, which must necessarily be present, is so small that the start commutation can be reliably found even when the motor shaft is blocked (brake active), solely on the basis of the shaft torsion (in the μm range) or in linear drives by twisting the guide member.

Equivalent elements can be substituted for ones set forth herein to achieve the same results in the same way and in the same manner.

Having thus described the present invention in the detailed description of the preferred embodiment, what is desired to be obtained in Letters Patent is:

1. A method of initiating a start commutation of synchronous servo-drives utilizing two coupled control circuits, the steps of the method comprising:

a) providing a current control circuit and an angle control circuit for said two coupled control circuits;

b) outputting a field angle α from said angle control circuit;
c) outputting a transverse current iQ from said current control circuit, said transverse current iQ derived through a minimized Clarke-Park transformation incorporating two phase currents iU and iV and said field angle α as inputs, thereafter outputting a current vector iM;
d) outputting voltages uU, uV and uW by a minimized inverse Clarke-Park transformation incorporating said transverse current iQ and said field angle α as inputs;
e) providing an incremental position sensor signal to said angle control circuit;
f) inputting a ramp-like current desired value to said current control circuit;
g) inputting a constant angle desired value to said angle control circuit;
h) controlling said transverse current iQ with said angle control circuit by rotating an electromagnetic field;
i) inputting an S-shaped disturbance signal into said angle control circuit;
j) providing a shaft for said servo-drive, said shaft mechanically fixed in position during an initialization of said start commutation, and said shaft precisely controlled to a same position as at a beginning following said initialization.

2. The method of claim 1, further comprising the step of adjusting an angle of said electromagnetic field for maintaining said constant angle desired value at a constant value, said angle actual angle derived from said incremental position sensor signal.

3. The method of claim 2, wherein said angle of said magnetic field is a desired output of said angle control circuit.

4. The method of claim 1, wherein said current control circuit and said angle control circuit are coupled together within a digital signal processor controller.

5. The method of claim 1, wherein said incremental position sensor signal is derived from a quadrature encode pulse circuit coupled to an output of said synchronous servo-drives.

* * * * *